UNITED STATES PATENT OFFICE.

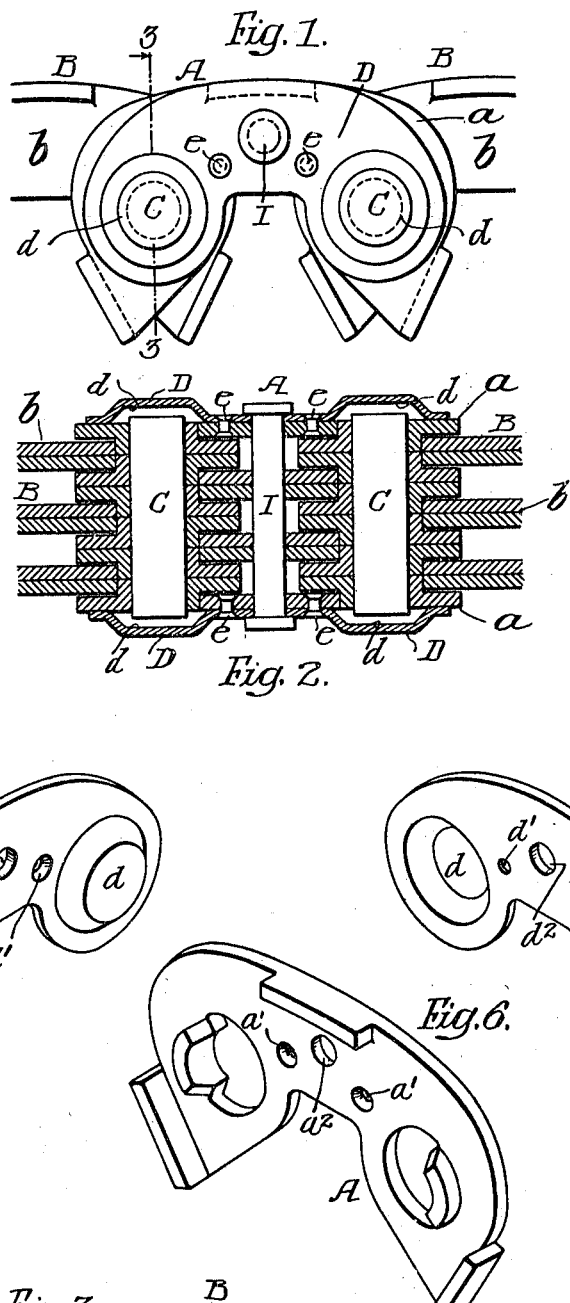

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN.

1,004,389.  Specification of Letters Patent.  Patented Sept. 26, 1911.

Application filed May 9, 1911. Serial No. 626,099.

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in chains, especially drive chains having teeth which engage the teeth of sprocket wheels.

The object of my invention is to construct the chain so that a plain pivot pin can be used and also to provide cap plates which limit the longitudinal movement of the pins.

In the accompanying drawings:—Figure 1, is a side view of sufficient of a drive chain to illustrate my invention; Fig. 2, is a sectional plan view; Fig. 3, is a transverse sectional view on the line 3—3, Fig. 1; Figs. 4 and 5, are detached perspective views of one of the cap plates; Fig. 6, is a perspective view of one of the link plates, and Fig. 7, is a perspective showing one of the cap plates perforated.

A and B are the links of the chain connected by pivot pins C. Each link is made of a series of plates $a$ and $b$ respectively, and, in the present instance, the plates of one link alternate with the plates of another link at the pivot, as clearly illustrated in Fig. 2. The pivot pins C are cylindrical and of an even diameter throughout; being free to turn in the pivot pin openings in both sets of links.

Each plate, in the present instance, as shown in Fig. 6, has extended bearings at the pivot pin openings and extended bearings on the teeth and in order to properly space the plates apart a flange is also formed at a point about the center of the plate, and the extended bearings at the teeth and the center flange of one plate contact with the same elements on an adjacent plate.

In order to retain the pivot pins C within the pivot pin openings, I provide cap plates D. These cap plates are made, as clearly shown in Figs. 4 and 5, and have recessed portions $d$, $d$ which extends over the projecting ends of the pins C and are secured to the side plates $a$ of the links A by rivets $e$, in the present instance. These rivets pass through openings $a'$ in the side link plate $a$.

In order to couple the several link plates together transversely, independently of the pivot pins, I provide a rivet I for each link A and this rivet passes through openings $a^2$ in the several link plates and through openings $d^2$ in the cap plate.

By the above construction the cap plates and the link plates are transversely coupled together, independently of the pivot pins, so as to allow the pivot pins freedom to rotate and also to allow for a limited longitudinal movement of the pivot pins; thus preventing grooving of the contacting parts.

The caps $d$ are on a line with or project beyond the heads of the rivets I and thus take the side wear or rubbing of the chain upon the flange of the sprocket wheel when a flanged wheel is used.

In some instances the cap plates may be perforated at $i$, as in Fig. 7, to allow the escape of surplus lubricant or dirt from the pivot pin cavity.

I claim:—

1. The combination in a chain, of a series of links and pivot pins, each link being made of a number of link plates, said pivot pins being of an even diameter throughout, with cap plates secured to the outer link plates and extending over the openings for the pivot pins, the distance between the inner walls of the opposite cap plates being greater than the length of the pivot pin, so as to allow the pin a certain amount of longitudinal movement over the bearing face of the links.

2. The combination in a chain of a series of links, pivot pins coupling said links, each of said links being made of a series of link plates, with cap plates having recessed portions and extending over the pivot pin openings of the links, the recessed portions alining with the pivot pin openings, with means of securing the cap plates rigidly to the outer link plates of each alternate link.

3. The combination in a chain, of a series of links, loose pivot pins coupling the links, each link being made up of a series of link plates, cap plates having recessed portions alining with the pivot pin openings, rivets securing the cap plates to the outside link plates of each alternate link, and a through rivet coupling all the plates of said links, the pivot pins being free to rotate in the pivot pin openings of the links.

4. The combination in a chain, of a series of links, loose pivot pins coupling the links, a cap secured to the outer plate of each link, with through bolts coupling the several plates of each link, and the caps being substantially flush with the transverse fastening means.

5. The combination in a chain, of a series of links, pivot pins coupling the links, cap plates secured to the outer plates of the alternate links, said cap plates having cavities in line with the pivot pins and perforated at the cavities.

In testimony whereof, I have signed my name to this specification, in the presence of two subscribing witnesses.

JAMES M. DODGE.

Witnesses:
 WM. E. SHUPE,
 WM. A. BARR.